(12) United States Patent
Uejima et al.

(10) Patent No.: US 10,189,713 B2
(45) Date of Patent: Jan. 29, 2019

(54) METHOD FOR PRODUCING CARBON NANOTUBE DISPERSION LIQUID, METHOD FOR PRODUCING COMPOSITE MATERIAL COMPOSITION, METHOD FOR PRODUCING COMPOSITE MATERIAL, COMPOSITE MATERIAL, AND COMPOSITE-MATERIAL SHAPED PRODUCT

(71) Applicant: ZEON CORPORATION, Chiyoda-ku, Tokyo (JP)

(72) Inventors: Mitsugu Uejima, Tokyo (JP); Masahiro Shigeta, Tokyo (JP)

(73) Assignee: ZEON CORPORATION, Chiyoda-ku, Tokyo (JP)

(*) Notice: Subject to any disclaimer, the term of this patent is extended or adjusted under 35 U.S.C. 154(b) by 112 days.

(21) Appl. No.: 14/907,054

(22) PCT Filed: Jul. 23, 2014

(86) PCT No.: PCT/JP2014/003857
§ 371 (c)(1),
(2) Date: Jan. 22, 2016

(87) PCT Pub. No.: WO2015/015758
PCT Pub. Date: Feb. 5, 2015

(65) Prior Publication Data
US 2016/0159652 A1     Jun. 9, 2016

(30) Foreign Application Priority Data

Jul. 31, 2013 (JP) .................................. 2013-159847

(51) Int. Cl.
*C01B 32/174* (2017.01)
*C01B 32/168* (2017.01)
(Continued)

(52) U.S. Cl.
CPC ........... *C01B 32/174* (2017.08); *C08J 3/2053* (2013.01); *C08K 7/24* (2013.01); *B82Y 30/00* (2013.01);
(Continued)

(58) Field of Classification Search
CPC ..... B82Y 30/00; B82Y 40/00; C01B 2202/32; C01B 31/0273
(Continued)

(56) References Cited

U.S. PATENT DOCUMENTS

2007/0284987 A1  12/2007 Liu et al.
2008/0048364 A1   2/2008 Armeniades et al.
(Continued)

FOREIGN PATENT DOCUMENTS

CN     101663714 A     3/2010
CN     104936895 A     9/2015
(Continued)

OTHER PUBLICATIONS

Sep. 16, 2014, International Search Report issued in International Patent Application No. PCT/JP2014/003857.
(Continued)

*Primary Examiner* — Tri V Nguyen
(74) *Attorney, Agent, or Firm* — Kenja IP Law PC

(57) ABSTRACT

Provided is a method for efficiently producing a carbon nanotube dispersion liquid in which less-damaged carbon nanotubes are highly dispersed. The method for producing a carbon nanotube dispersion liquid includes: (A) obtaining a carbon nanotube dispersion liquid by applying a shear force to a coarse dispersion liquid that includes carbon nanotubes having a specific surface area of 600 $m^2/g$ or more to whereby disperse the carbon nanotubes, wherein the step (A)
(Continued)

includes at least one of applying a back pressure to the carbon nanotube dispersion liquid and cooling the carbon nanotube dispersion liquid.

5 Claims, 1 Drawing Sheet

(51) Int. Cl.
    *B82Y 40/00*     (2011.01)
    *C08J 3/205*     (2006.01)
    *C08K 7/24*     (2006.01)
    *B82Y 30/00*     (2011.01)

(52) U.S. Cl.
    CPC ........... *B82Y 40/00* (2013.01); *C01B 2202/22* (2013.01); *C01B 2202/32* (2013.01); *C08J 2309/04* (2013.01); *C08K 2201/011* (2013.01)

(58) Field of Classification Search
    USPC .................................................. 252/502, 511
    See application file for complete search history.

(56) References Cited

U.S. PATENT DOCUMENTS

| | | | |
|---|---|---|---|
| 2010/0189628 A1* | 7/2010 | Schimpf | B82B 3/0076 |
| | | | 423/447.2 |
| 2011/0127472 A1 | 6/2011 | Sato et al. | |
| 2012/0145968 A1 | 6/2012 | Shimizu et al. | |
| 2012/0301620 A1 | 11/2012 | Liu et al. | |
| 2013/0029089 A1 | 1/2013 | Kia | |
| 2013/0337707 A1 | 12/2013 | Hata et al. | |
| 2014/0010749 A1* | 1/2014 | Nakamura | D01G 13/00 |
| | | | 423/447.1 |
| 2014/0353556 A1 | 12/2014 | Shigeta et al. | |
| 2015/0090920 A1* | 4/2015 | Everill | C09D 11/52 |
| | | | 252/62.2 |
| 2015/0368108 A1 | 12/2015 | Sone | |
| 2016/0020466 A1* | 1/2016 | Ulbrich | H01M 4/0404 |
| | | | 429/217 |

FOREIGN PATENT DOCUMENTS

| | | |
|---|---|---|
| EP | 1522552 A1 | 4/2005 |
| EP | 2949624 A1 | 12/2015 |
| JP | 2005-219964 A | 8/2005 |
| JP | 2006-016222 A | 1/2006 |
| JP | 2009245887 A | 10/2009 |
| JP | 2010-254546 A | 11/2010 |
| JP | 2013-100206 A | 5/2013 |
| WO | 2009041583 A1 | 4/2009 |
| WO | 2012/081601 A1 | 6/2012 |
| WO | 2013080912 A1 | 6/2013 |
| WO | 2014115560 A1 | 7/2014 |

OTHER PUBLICATIONS

Apr. 25, 2017, Extended European Search Report issued by the European Patent Office in the corresponding European Patent Application No. 14832758.8.

Database WPI Week 200926 Thomson Scientific, London, GB; AN 2009-G63705, XP002768950, 2009.

Database WPI Week 200972 Thomson Scientific, London, GB; AN 2009-Q18156, XP002768949, 2009.

Database WPI Week 201243 Thomson Scientific, London, GB; AN 2012-H03312, XP002764135, 2012.

Feb. 2, 2016, International Preliminary Report on Patentability issued in the International Patent Application No. PCT/JP2014/003857.

Database WPI Week 201341 Thomson Scientific, London, GB; AN 2013-K42855, XP002764136, 2013.

Database WPI Week 201452 Thomson Scientific, London, GB; AN 2014-N99139, XP002764134, 2014.

Nov. 22, 2016, Partial Supplementary European Search Report issued by the European Patent Office in the corresponding European Patent Application No. 14832758.8.

Feb. 12, 2018, Communication pursuant to Article 94(3) EPC issued by the European Patent Office in the corresponding European Patent Application No. 14832758.8.

\* cited by examiner

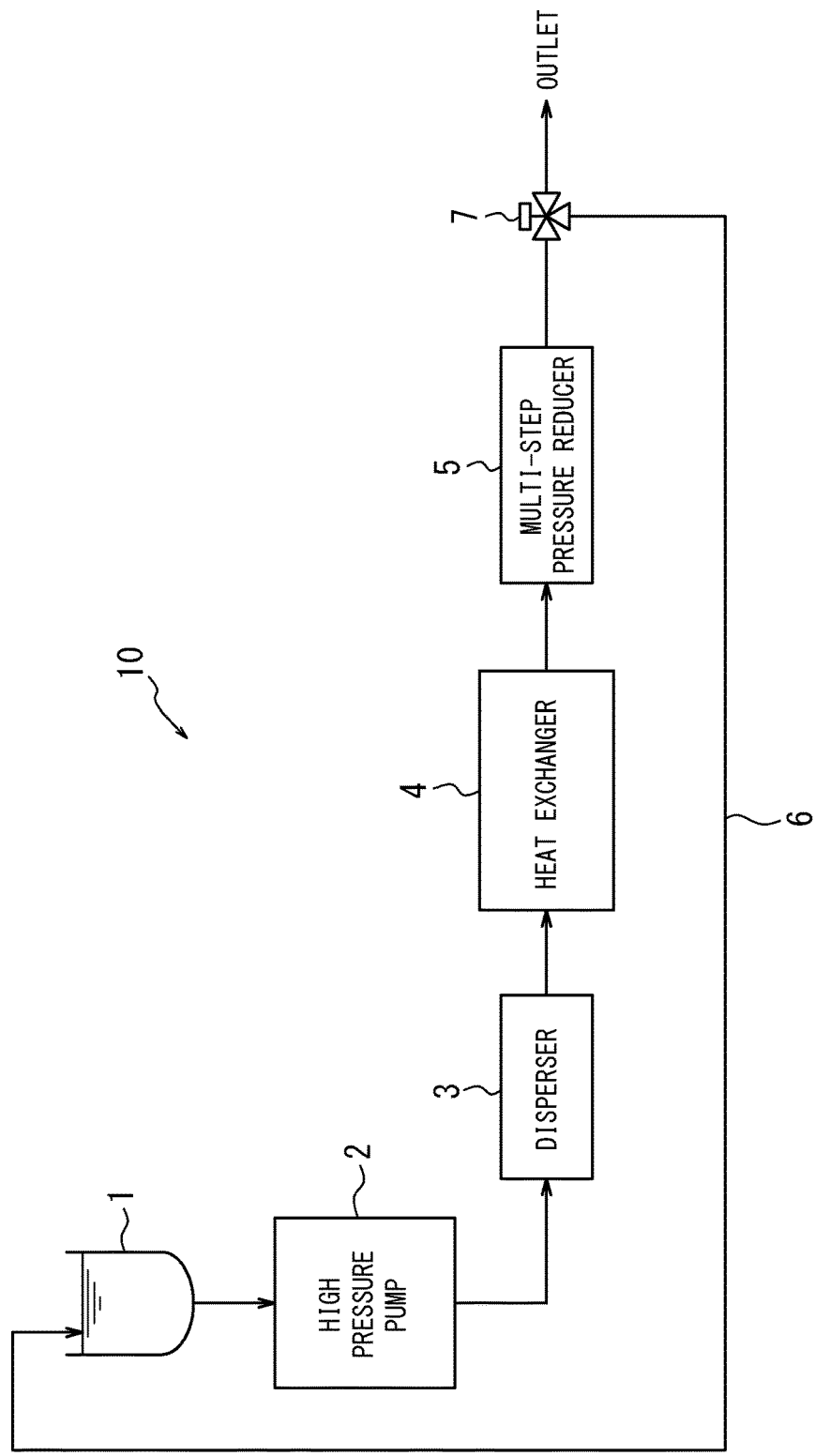

METHOD FOR PRODUCING CARBON NANOTUBE DISPERSION LIQUID, METHOD FOR PRODUCING COMPOSITE MATERIAL COMPOSITION, METHOD FOR PRODUCING COMPOSITE MATERIAL, COMPOSITE MATERIAL, AND COMPOSITE-MATERIAL SHAPED PRODUCT

TECHNICAL FIELD

The disclosure relates to a method for producing a carbon nanotube dispersion liquid, a method for producing a composite material composition, a method for producing a composite material, a composite material, and a composite-material shaped product. Specifically, the disclosure relates to a method for producing a carbon nanotube dispersion liquid, a method for producing a composite material composition including the carbon nanotube dispersion liquid, and a method for producing a composite material formed from the composite material composition. The disclosure further relates to a composite material obtained by the method for producing a composite material and a composite-material shaped product formed from the composite material.

BACKGROUND

Composite materials, particularly those obtained by blending carbon materials into polymer materials such as resin and rubber, have been conventionally used as materials with superior electrical conductivity and mechanical characteristics. Among carbon materials, carbon nanotubes (hereinafter "CNTs") are now attracting attention because they highly improve electrical conductivity and mechanical characteristics. Specifically, a single-walled carbon nanotube (hereinafter "SWCNT"), a fibrous conductive filler that exhibits high electrical conductivity, is attracting particular attention as a carbon material of composite materials. SWCNT can improve the electrical conductivity and mechanical characteristics of the composite materials well even when the blending amount thereof is small.

Carbon materials or CNTs need to be uniformly dispersed in a matrix of a polymer material to achieve improved electrical conductivity and mechanical characteristics in the composite material well. The following technique has been proposed in the art: a CNT dispersion liquid obtained by uniformly dispersing CNTs in a solvent and a polymer material are mixed together to form a composite material composition, which is then prepared into a composite material where CNTs are uniformly dispersed in a matrix of the polymer material.

However, CNTs such as SWCNTs and the like having a large specific surface area tend to aggregate and tangle one another. Thus, the production of composite materials that include CNTs as a carbon material requires a technique of efficiently preparing a CNT dispersion liquid in which CNTs are uniformly dispersed.

To achieve this, JP2006016222A (PTL 1) for example proposes breaking coarsely-dispersed CNTs in a solvent using shear forces, shock waves, cavitation, and the like. This highly disperses the broken CNTs in a CNT dispersion liquid. JP2010254546A (PTL 2) proposes cutting and untangling aggregated CNTs in a solvent using an ultrasonic homogenizer. This also highly disperses CNTs in a CNT dispersion liquid.

CITATION LIST

Patent Literature

PTL 1: JP2006016222A
PTL 2: JP2010254546A

SUMMARY

Technical Problem

The above-described conventional methods for producing a CNT dispersion liquid, where CNTs are dispersed by positive breaking or cutting, cause great damage to CNTs during the dispersion process. This may inhibit the composite material prepared with the resulting CNT dispersion liquid from demonstrating intended electrical conductivity or mechanical characteristics.

In view of the above, it is an object of the disclosure to provide a method for efficiently producing a CNT dispersion liquid in which less-damaged CNTs are highly dispersed. Another object is to provide a method for producing a composite material composition and a method for producing a composite material that include the CNT dispersion liquid produced by the above method.

Still another object is to provide a composite material and a composite-material shaped product with superior electrical conductivity and mechanical characteristics.

Solution to Problem

Various studies have been made to achieve the above objects and the following facts have been discovered: when CNTs with a certain specific surface area is prepared into a coarse dispersion liquid and are subjected to a shear force while being subjected to a back pressure and/or cooled to reduce formation of air bubbles, the CNTs can be uniformly and efficiently dispersed without dispersion effects by cavitation (i.e., formation and burst of air bubbles). In a dispersion liquid obtained as such, CNTs are less damaged. Based on the discoveries, the methods and products to be disclosed herein have been reached.

To advantageously solve the above-mentioned problem, the method for producing a carbon nanotube dispersion liquid according to the disclosure includes: (A) obtaining a carbon nanotube dispersion liquid by applying a shear force to a coarse dispersion liquid that includes carbon nanotubes having a specific surface area of 600 $m^2/g$ or more to whereby disperse the carbon nanotubes, wherein the step (A) includes at least one of applying a back pressure to the carbon nanotube dispersion liquid and cooling the carbon nanotube dispersion liquid. The application of back pressure and/or cooling upon application of a shear force to the coarse dispersion liquid to disperse the carbon nanotubes allows for reduction in formation of air bubbles in the dispersion liquid. This further suppresses adhesion of air bubbles to the CNTs and energy loss due to the formation of air bubbles, thereby allowing CNTs with a large specific surface area to be dispersed uniformly and efficiently. The dispersibility obtained by the suppressed adhesion of air bubbles to the CNTs will be improved particularly well when CNTs with a specific surface area of 600 $m^2/g$ or more are dispersed. The reduction in formation of air bubbles in the dispersion liquid can also prevent CNTs from being damaged by cavitation.

"Specific surface area" as used herein refers to a nitrogen absorption specific surface area measured by a BET method ("BET specific surface area").

The method for producing a carbon nanotube dispersion liquid preferably further includes: (B) reducing multi-stepwise the back pressure applied to the carbon nanotube dispersion liquid obtained by the step (A). The multi-stepwise back-pressure reduction in the CNT dispersion liquid, performed when back pressure is applied in the step (A), can reduce the formation of air bubbles in the dispersion liquid caused by pressure drop that occurs as the CNT dispersion liquid with a back pressure was released into atmospheric pressure. The reduction in air bubbles can prevent the CNTs from being damaged so that the CNTs can be dispersed uniformly and efficiently.

The above CNT dispersion liquid obtained by the method for producing a carbon nanotube dispersion liquid may be mixed together with a polymer material-containing liquid, such as latex, to be used for producing a composite material composition.

Such a composite material composition obtained as above may be used for producing a composite material.

The above composite material composition may be formed into the composite material by solidification, and the composite material may be shaped into a composite-material shaped product. The composite material and the composite-material shaped product contain uniformly-dispersed, less-damaged CNTs, thereby exhibiting intended performance.

Advantageous Effect

One or more embodiments herein provide a method for efficiently producing a carbon nanotube dispersion liquid in which less-damaged CNTs are highly dispersed.

Another embodiment provides a method for producing a composite material composition and a method for producing a composite material including the carbon nanotube dispersion liquid produced by the above method for producing a carbon nanotube dispersion liquid.

Still another embodiment provides a composite material and a composite-material shaped product with superior electrical conductivity and mechanical characteristics.

BRIEF DESCRIPTION OF THE DRAWINGS

In the accompanying drawing, FIG. 1 is a schematic view of a dispersion system that may be used in a typical method for producing a carbon nanotube dispersion liquid disclosed herein.

DETAILED DESCRIPTION

Embodiments will now be described in detail.

The method for producing a carbon nanotube ("CNT") dispersion liquid to be disclosed herein can be used to produce a CNT dispersion liquid including uniformly-dispersed CNTs in a solvent.

The CNT dispersion liquid produced by the above method for producing a CNT dispersion liquid can be mixed for example with a polymer material-containing liquid, such as latex, to be used for producing a composite material composition. Alternatively, the CNT dispersion liquid may be directly used for, for example, formation of a conductive thin film without being mixed together with latex or the like.

The composite material composition can be used for producing a composite material. The composite material can be shaped in accordance with the intended use and formed into a composite-material shaped product before being used. (Method for Producing Carbon Nanotube Dispersion Liquid)

The method for producing a carbon nanotube dispersion liquid according to the disclosure includes obtaining a carbon nanotube dispersion liquid by applying a shear force to a coarse dispersion liquid that includes carbon nanotubes having a specific surface area of 600 $m^2/g$ or more to whereby disperse the carbon nanotubes. The above method for producing a carbon nanotube dispersion liquid further includes applying a back pressure to the carbon nanotube dispersion liquid and/or cooling the carbon nanotube dispersion liquid when dispersing the carbon nanotubes by applying a shear force to the coarse dispersion liquid.

<Coarse Dispersion Liquid>

The coarse dispersion liquid includes CNTs and a solvent. The coarse dispersion liquid can be obtained by adding CNTs to a solvent and mixing them under no pressure optionally using a mixer or the like. The coarse dispersion liquid is prepared preferably by a method that causes minimum damage to CNTs.

The coarse dispersion liquid may optionally contain additives such as a dispersant and the like.

[Carbon Nanotubes (CNTs)]

CNTs to be dispersed in the coarse dispersion liquid needs to have a specific surface area of 600 $m^2/g$ or more before being added to a solvent. Such CNTs may or may not be opened. Unopened CNTs preferably have a specific surface area of 800 $m^2/g$ or more, but preferably of 1,200 $m^2/g$ or less, and more preferably of 1,000 $m^2/g$ or less. Opened CNTs preferably have a specific surface area of 1,300 $m^2/g$ or more, but preferably of 2,500 $m^2/g$ or less, and more preferably 2,300 $m^2/g$ or less. The CNTs having a specific surface area of 600 $m^2/g$ or more enables improved dispersibility particularly well in the CNT dispersion liquid prepared in accordance with the method for producing a CNT dispersion liquid disclosed herein. The CNTs having a specific surface area of 600 $m^2/g$ or more also enables improved electrical conductivity and mechanical characteristics well in a composite material prepared with the CNT dispersion liquid. Further, the CNTs having a specific surface area within the above range will have improved dispersibility and can be sufficiently prevented from being damaged when subjected to a shear force in the coarse dispersion liquid to be dispersed.

Any type of CNT that has a specific surface area of 600 $m^2/g$ or more may be used. For example, it may be a single-walled carbon nanotube or a multi-walled carbon nanotube. Of these, a single-walled carbon nanotube is preferable. The use of single-walled carbon nanotubes will further improve, as compared to the use of multi-walled carbon nanotubes, the electrical conductivity and mechanical characteristics of the composite material prepared with the CNT dispersion liquid.

The CNTs preferably have a radial breathing mode (RBM) peak when evaluated by Raman spectroscopy. In this regard, there is no RBM in the Raman spectra of a multi-walled CNT with three or more walls.

The CNTs preferably have a ratio of the peak intensity of G band to that of D band (G/D ratio) in the Raman spectra of from 1 to 20. The CNTs having a G/D ratio of from 1 to 20 enables sufficiently improved electrical conductivity and mechanical characteristics in the composite material prepared with the CNT dispersion liquid, even if the blending amount of the CNTs is small.

The CNTs preferably have a ratio of a diameter distribution (3σ) to an average diameter (Av) (3σ/Av) of more than 0.20 to less than 0.60, more preferably of more than 0.25, and further preferably more than 0.50. The use of CNTs having 3σ/Av of more than 0.20 to less than 0.60 enables sufficiently improved electrical conductivity and mechanical characteristics in the composite material prepared with the CNT dispersion liquid, even if the blending amount of the CNTs is small.

"Diameter distribution ($3\sigma$)" refers to the value obtained by multiplying the standard deviation ($\sigma$) of the diameters of the carbon nanotubes by three. Both of "Average diameter (Av) of carbon nanotubes" and "standard deviation ($\sigma$) of the diameters of carbon nanotubes" can be obtained by measuring the diameters of 100 carbon nanotubes using a transmission electron microscope.

The average diameter (Av) of the CNTs is preferably 0.5 nm or more, and more preferably 1 nm or more, but is preferably 15 nm or less, and more preferably 10 nm or less. The CNTs having an average diameter (Av) of 0.5 nm or more will be prevented from aggregating so that dispersibility in the CNT dispersion liquid can be further increased. The CNTs having an average diameter (Av) of 15 nm or less enables sufficiently improved mechanical characteristics in the composite material prepared with the CNT dispersion liquid.

The above average diameter (Av) and the diameter distribution ($3\sigma$) of CNTs may be adjusted by varying the producing method or producing conditions of CNTs or by combining multiple types of CNT each obtained by a different producing method.

The CNTs commonly used are those that demonstrate normal distribution when they are plotted by having the diameter obtained by measuring diameters of 100 CNTs using a transmission electron microscope on the horizontal axis and the frequency on the vertical axis, and approximated by Gaussian functions.

The CNTs preferably have a structure length of 100 μm or more to 5,000 μm or less, and more preferably of 300 μm or more to 2,000 μm or less when synthesized. With the method for producing a CNT dispersion liquid disclosed herein, the CNTs as synthesized having a structure length of even 100 μm or more can be sufficiently prevented from being damaged during dispersion. The longer the synthesized structure, the more frequently the CNTs are broken or cut to be damaged during dispersion. Thus, the length of the synthesized structure of CNTs is preferably 5,000 μm or less.

The CNTs preferably have a weight density of 0.002 g/cm$^3$ or more to 0.2 g/cm$^3$ or less. The CNTs having a weight density of 0.2 g/cm$^3$ or less will have weakened binding so that the CNTs can be dispersed more uniformly. The CNTs having a weight density of 0.002 g/cm$^3$ or more will have improved unity so that the CNTs are less likely to be unbound and thus are easy to handle.

Preferred examples of the CNTs having the above properties include those obtained by a super growth method, which are described in Japanese Patent Nos. 4,621,896 and 4,811,712 (corresponding to EP1787955 and US2009/297846, respectively). Such CNTs obtained by a super growth method may be referred to as "SGCNTs".

The super growth method is basically a CVD method, where a catalyst activating material such as water is brought into contact with a catalyst together with a source gas, to significantly increase the activity and the life of the catalyst.

[Solvent]

Examples of the solvent in which the CNTs are dispersed include, but are not limited to, a aliphatic hydrocarbon solvent, an aromatic hydrocarbon solvent, an ether solvents, an alcohol solvent, an ester solvent, a ketone solvent, any combination thereof, and water. Combination of water and any of the above solvents may also be used as the solvent. These solvents may be used alone or in combination of two or more thereof.

Of the above, considering operability and dispersibility of the CNTs, a solvent having a solubility parameter (SP value) of 8 (cal/cm$^3$)$^{1/2}$ or more is preferable as the solvent. The solubility parameter of the solvent is preferably 26 (cal/cm$^3$)$^{1/2}$ or less. Specifically, a solvent having a large solubility parameter is preferable. Examples thereof include water (23.4), 1-methyl-2-pyrrolidone (11.2), dimethylformamide (12.1), dimethylsulfoxide (12.3), dimethylacetamide (10.8), toluene (8.9), methanol (14.5), tetrahydrofuran (9.1), ethyl acetate (9.1), acetonitrile (11.9), ethylene glycol (14.6), methyl isobutyl ketone (8.4), and butyl alcohol (11.4). The values within the parentheses indicate values of solubility parameters.

"Solubility parameter" herein is defined as a square root of cohesive energy density, which hardly has entropy change caused by mixture. This parameter was proposed by Hildebrand and Scott based on a regular solution where entropy change occurs. Solubility parameters of typical solvents are provided in Polymer Handbook 3rd Ed. Willey-Interscience (1989).

[Additives]

The additives that may be optionally blended in the coarse dispersion liquid may be, but are not limited to, conventional additives such as a dispersant and the like.

The dispersant may be any conventional dispersant that can assist dispersion of CNTs. Specifically, examples of an aqueous dispersant suitably used for water-containing solvent include a surfactant and polysaccharides. Of these, a surfactant is more preferable, and an anionic surfactant is further preferable. This is because it provides superior dispersibility to CNTs and exhibit superior applicability to the composite material. Examples of a non-aqueous dispersant suitably used for organic solvents include a π-conjugated polymer and a polymer that has an ethylene chain as a main chain. Of these, a polymer that has an ethylene chain as a main chain (such as polystyrene and polyvinyl pyrrolidone) is preferable for its ready availability.

[Properties of Coarse Dispersion Liquid]

The amount of the CNTs in the coarse dispersion liquid is preferably 0.1 mass parts or more, and more preferably 0.5 mass parts or more, but is preferably 10 mass parts or less, and more preferably 5 mass parts or less, per 100 mass parts of the total amount of the solvent and the dispersant. When the CNT amount is 0.1 mass parts or more per 100 mass parts of the total amount of the solvent and the dispersant, the composite-material shaped product or the like formed with the CNT dispersion liquid can be produced with higher productivity. When the CNT amount is 10 mass parts or less per 100 mass parts of the total amount of the solvent and the dispersant, the CNTs can be highly dispersed and also prevented from contacting with one another to be damaged during dispersion.

When the dispersant is a surfactant and is blended into the coarse dispersion liquid, the concentration of the dispersant may be any value that is not lower than the critical micelle concentration.

<Dispersion Process of CNTs Contained in Coarse Dispersion Liquid>

The method for producing a carbon nanotube dispersion liquid according to the disclosure includes applying a shear force to the above coarse dispersion liquid to further disperse the CNTs in the coarse dispersion liquid, thereby preparing a CNT dispersion liquid. The above method for producing a carbon nanotube dispersion liquid requires applying a back pressure to the CNT dispersion liquid and/or cooling the CNT dispersion liquid while dispersing the CNTs contained in the coarse dispersion liquid.

When the back pressure is applied to the CNT dispersion liquid, such a back pressure may be reduced to atmospheric pressure at once or may be reduced multi-stepwise. The latter is preferable.

[Dispersion System]

The method for producing a CNT dispersion liquid according to the disclosure may be performed by using for example a dispersion system 10 shown in FIG. 1, without particular limitation, to disperse the CNTs contained in the coarse dispersion liquid by applying a shear force to the coarse dispersion liquid.

In the following, the production of a CNT dispersion liquid will be described with reference to one example of the method for producing a CNT dispersion liquid according to the disclosure by using the dispersion system 10 shown in FIG. 1, yet the method for producing a CNT dispersion liquid may be performed using a dispersion system other than the dispersion system 10 shown in FIG. 1.

The dispersion system 10 shown in FIG. 1 includes a reservoir 1 for storing a coarse dispersion liquid, a high pressure pump 2 for applying pressure to the coarse dispersion liquid stored in the reservoir 1 and sending the pressurized coarse dispersion liquid to a disperser 3, and the disperser 3 for dispersing the CNTs contained in the pressurized coarse dispersion liquid. The dispersion system 10 further includes a heat exchanger 4 for cooling the CNT dispersion liquid yielded by the disperser 3, and a multi-step pressure reducer 5 for reducing, multi-stepwise, the pressure (back pressure) applied to the CNT dispersion liquid cooled by the heat exchanger 4. The dispersion system 10 still further includes a return line 6 for sending back to the reservoir 1 the CNT dispersion liquid whose pressure has been reduced by the multi-step pressure reducer 5, and a flow path switch valve (three-way valve) 7 for switching a flow path of the CNT dispersion liquid whose pressure has been reduced by the multi-step pressure reducer 5.

[Application of Pressure to Coarse Dispersion Liquid]

In the high pressure pump 2, the coarse dispersion liquid is pressurized until for example 10 to 400 MPa, preferably 50 to 250 MPa. The pressurized coarse dispersion liquid is sent to the disperser 3.

[Dispersion of CNTs Contained in Coarse Dispersion Liquid]

In the disperser 3, the coarse dispersion liquid is subjected to a shear force and the CNTs contained in the coarse dispersion liquid are dispersed. The disperser 3 then sends out a CNT dispersion liquid with a pressure (back pressure) lower than the pressure of the coarse dispersion liquid before entering into the disperser 3.

Specifically, the disperser 3 includes, without particular limitation, a disperser orifice having an inner diameter d1, a dispersion space having an inner diameter d2, and a termination section having an inner diameter d3, in this order from the inflow side to the outflow side of the coarse dispersion liquid, wherein d2>d3>d1.

The disperser 3 allows the high-pressurized coarse dispersion liquid, which has entered the disperser 3, to pass through the disperser orifice, while reducing the pressure of the dispersion liquid, and then to enter into the dispersion space in the form of fluid with high flow rate. The coarse dispersion liquid with high flow rate that has entered the dispersion space flows through the dispersion space at high speed, while being subjected to a shear force. As a result, the flow rate of the coarse dispersion liquid reduces, and the CNTs in the coarse dispersion liquid are dispersed well. The termination section then sends out a CNT dispersion liquid with a pressure (back pressure) lower than the pressure of the coarse dispersion liquid before entering into the disperser 3.

The back pressure can be applied to the CNT dispersion liquid by applying a load to the flow of the CNT dispersion liquid. For example, by disposing the below-described multi-step pressure reducer 5 downstream from the disperser 3, desired back pressure can be applied to the CNT dispersion liquid. The disperser 3 may include a heat exchanger or a coolant supplying mechanism to cool the CNT dispersion liquid.

The disperser 3 applies a back pressure to the CNT dispersion liquid while applying a shear force to the coarse dispersion liquid to disperse the CNTs. This reduces, as compared to the case where no back pressure is applied, formation of air bubbles in the dispersion liquid caused by the pressure drop that occurs as the dispersion liquid enters the dispersion space. As a result, the CNTs are prevented from being damaged by cavitation (i.e., formation and burst of air bubbles), particularly by shock waves caused when air bubbles burst. In addition, adhesion of air bubbles to the CNTs and energy loss due to the formation of air bubbles can be reduced, and thus CNTs with a large specific surface area can also be uniformly and efficiently dispersed.

The effect of improving dispersibility obtained by the reduced adhesion of air bubbles to the CNTs is extremely large for CNTs with a large specific surface area, in particular CNTs with a specific surface area of 600 $m^2/g$ or more. The reason is that as the specific surface area of the CNTs is larger and air bubbles adhere more easily to the surface of the CNTs, the dispersibility tends to lower when air bubbles form and adhere.

The above disperser 3 includes the disperser orifice with a sufficiently large inner diameter for the size of the CNTs. Thus, even when a high concentration coarse dispersion liquid that contains a large amount of CNTs (for example, a coarse dispersion liquid containing 0.5 mass parts or more of the CNTs per 100 mass parts of the total amount of the solvent and the dispersant) is used, the CNTs will not clog the flow path.

[Cooling of CNT Dispersion Liquid]

The heat exchanger 4 cools the CNT dispersion liquid that has been heated by the shear force applied by the disperser 3. This cooling further reduces the formation of air bubbles in the CNT dispersion liquid. Alternatively, the coarse dispersion liquid may be cooled in advance to reduce the formation of air bubbles in the CNT dispersion liquid, eliminating the heat exchanger 4.

[Pressure Reduction in CNT Dispersion Liquid]

The multi-step pressure reducer 5 reduces the back pressure applied to the CNT dispersion liquid multi-stepwise to reduce the formation of air bubbles in the CNT dispersion liquid that may occur as the CNT dispersion liquid is released into atmospheric pressure at the outlet of the dispersion system 10.

Specifically, the multi-step pressure reducer 5 includes, without particular limitation, a plurality of pressure reducers connected in series. Each pressure reducer is provided with a component that restricts the flow rate of the CNT dispersion liquid (for example, an orifice) to reduce the back pressure of the CNT dispersion liquid.

The magnitude of the back pressure of the CNT dispersion liquid, which is reduced by each pressure reducer, can be adjusted for example by varying the inner diameter of the orifice. For example, by designing the multi-step pressure reducer such that the inner diameter of the orifice of the pressure reducer becomes smaller toward the downstream side, the back pressure can be reduced stepwise. To sufficiently reduce the formation of air bubbles in the CNT dispersion liquid and prevent the CNTs from being damaged, the back pressure is preferably reduced to a level that does not cause air bubbles when the CNT dispersion liquid is released into the atmospheric pressure.

[Collection of CNT Dispersion Liquid]

The CNT dispersion liquid discharged from the multi-step pressure reducer 5 can be collected by using the flow path switch valve (three-way valve) 7 to switch the flow path of the CNT dispersion liquid to the outlet of the dispersion system 10. Optionally, if the CNTs are not dispersed sufficiently, the flow path switch valve (three-way valve) 7 may be used to switch the flow path of the CNT dispersion liquid to the return line 6 so as to circulate the CNT dispersion liquid through the system and repeatedly perform the dispersion process.

The dispersion system structured as above may be constructed for example by using the dispersion device named "BERYU SYSTEM PRO" commercially available from Beryu Corp. This dispersion device includes the above-described reservoir 1, the high pressure pump 2, the disperser 3, and the heat exchanger 4. The method for producing a CNT dispersion liquid according to the disclosure can be performed by referring to the instruction manual of the dispersion system and appropriately setting dispersion conditions.

The dispersion system used in the method for producing a CNT dispersion liquid may reduce the formation of air bubbles by cooling the CNT dispersion liquid during the dispersion process. Specifically, the dispersion system may replace the above disperser 3 with a disperser that has a heat exchanger or a coolant supplying mechanism for cooling the CNT dispersion liquid. Such a dispersion system may perform the dispersion process by applying a shear force to the coarse dispersion liquid but without applying back pressure.

(Method for Producing Composite Material Composition)

The method for producing a composite material composition according to the disclosure includes mixing the CNT dispersion liquid obtained by the above method for producing a CNT dispersion liquid with a polymer material-containing liquid. The composite material composition may be blended with additives suitable for the intended use of the composite material prepared with the composite material composition.

<CNT Dispersion Liquid>

The CNT dispersion liquid obtained by the above method for producing a CNT dispersion liquid may be used. The CNT dispersion liquid is preferably in a state of being uniformly dispersed without any visually-observable aggregate.

<Polymer Material-Containing Liquid>

When water or a mixture of water and other solvent is used as a solvent for dispersing the CNTs, latex is suitably used as the polymer material-containing liquid.

When an organic solvent is used as a solvent for dispersing the CNTs, a polymer material solution obtained by dissolving a polymer material in the organic solvent as used is suitably used as the polymer material-containing liquid.

[Latex]

The latex may be a polymer material latex suitable for the intended use of the composite material prepared with the composite material composition. Specifically, the latex may be a rubber latex or a resin latex. Examples of the rubber latex include, but are not limited to, natural rubber latex and synthetic diene-based rubber latex (e.g., latexes of butadiene rubber, styrene-butadiene rubber, acrylonitrile-butadiene rubber, ethylene vinyl acetate rubber, chloroprene rubber, vinyl pyridine rubber, and butyl rubber). Examples of resin latex include, but are not limited to, latexes of styrene-based resin, acrylic resin, methacrylic resin, organic acid vinyl ester-based resin, vinyl ether-based resin, halogen-containing resin, olefinic resin, alicyclic olefinic resin, polycarbonate-based resin, polyester-based resin, polyamide-based resin, thermoplastic polyurethane resin, polysulfonic resin, polyphenylene ether-based resin, and silicone resin.

The above latex may be prepared for example by the following methods.

(1) A solution of resin or rubber obtained by dissolving it in an organic solvent is emulsified in water in the presence of a surfactant, and the organic solvent is then removed, as needed, to yield the latex.

(2) A monomer forming resin or rubber is emulsion polymerized or suspension polymerized to directly yield latex.

The concentration of the polymer material component in the latex is preferably, but is not limited to, 20 to 80 mass %, more preferably 20 to 60 mass % (in solid content), considering the uniform dispersibility in the latex.

[Polymer Material Solution]

The polymer material solution may be any that can be mixed together with the CNT dispersion liquid without causing phase separation. The polymer material solution is appropriately prepared by any method publicly known.

Examples of the organic solvent for the polymer material solution include, but are not limited to, 1-methyl-2-pyrrolidone, dimethylformamide, dimethylsulfoxide, dimethylacetamide, toluene, cyclohexane, normal hexane, methanol, tetrahydrofuran, ethyl acetate, butyl acetate, acetonitrile, ethylene glycol, methyl isobutyl ketone, butyl alcohol, and 1-octanol.

Examples of the polymer material include, but are not limited to, polystyrene, polyvinyl chloride, polyimide, polyacrylonitrile, polyvinyl pyrrolidone, polycarbonate, polyethylene terephthalate, cycloolefin polymer, polymethyl methacrylate, polybutadiene, styrene-butadiene copolymer, polyisoprene, and acrylonitrile-butadiene copolymer.

The concentration of the polymer material component in the polymer material solution is preferably, but is not limited to, 5 to 30 mass %, more preferably 8 to 20 mass %, to maintain a proper viscosity of the polymer material solution and enable good usability.

<Additives>

Examples of the additives include, but are not limited to, an antioxidant, a thermal stabilizer, a light stabilizer, an ultraviolet absorber, a cross-linking agent, a pigment, a coloring agent, a foaming agent, an antistatic agent, a flame retardant, a lubricant, a softener, a tackifier, a plasticizer, a mold release agent, a deodorizer, and perfume.

The additives may be directly blended, by for example melting and kneading, into a composite material having been prepared from a composite material composition, without blending them into the composite material composition as long as the expression of the desired effects is ensured.

<Preparation of Composite Material Composition>

The composite material composition may be obtained by mixing together the CNT dispersion liquid, the polymer material-containing liquid, and optionally additives using a conventional agitator such as an agitating blade, a magnetic agitation device, a planetary mill, or the like.

To uniformly disperse the CNTs in the composite material composition while preventing the CNTs from being damaged during mixing of the CNT dispersion liquid with the polymer material-containing liquid, the mixing time is preferably 10 minutes or more to 24 hours or less.

The amount of the CNTs in the composite material composition per 100 mass parts of the polymer material is preferably 0.01 mass parts or more, more preferably 0.1 mass parts or more, and further preferably 0.25 mass parts or more, but is preferably 10 mass parts or less, more preferably 7 mass parts or less, and further preferably 5 mass parts or less. When the CNT amount is 0.01 mass parts or more per 100 mass parts of polymer material, the composite material prepared from the composite material composition will have sufficient electrical conductivity and mechanical characteristics. When the CNT amount is 10 mass parts or less per 100 mass parts of polymer material, the CNTs will be prevented from being damaged while being uniformly dispersed in the composite material composition.

(Method for Producing Composite Material)

The method for producing a composite material according to the disclosure includes solidifying the above composite material composition.

<Solidification of Composite Material Composition>

When latex is used as the polymer material-containing liquid, the composite material composition may be solidified basically by using any publicly-known method for solidifying latex. Specific examples of the method for obtaining a composite material by solidifying a composite material composition include adding a composite material composition to a water-soluble organic solvent, adding an acid to a composite material composition, and adding a salt to a composite material composition.

The water-soluble organic solvent is preferably selected from solvents that do not dissolve the polymer material contained in the composite material composition but dissolve a dispersant. Examples of such an organic solvent include methanol, ethanol, 2-propanol, and ethylene glycol.

Examples of the acid include acids commonly used for solidifying latex, including acetic acid, formic acid, phosphoric acid, and hydrochloric acid.

Examples of the salt include salts publicly-known and commonly used for solidifying latex, including sodium chloride, aluminum sulfate, and potassium chloride.

When a polymer material solution is used as the polymer material-containing liquid, the composite material composition may be solidified basically by using any reprecipitation or steam solidification method that is publicly known as a solidifying method of a polymer material.

The composite material obtained by solidifying the composite material composition contains less-damaged CNTs that are uniformly dispersed in the matrix of the polymer material. The composite material may be optionally dried before being used as a material of a composite-material shaped product.

(Composite-Material Shaped Product)

The composite-material shaped product may be obtained by shaping the above composite material using a forming machine that corresponds to the shape of a desired shaped product. Examples of the forming machine include an extruder, an injection forming machine, a compressor, and a roller. The composite-material shaped product may optionally be subjected to cross-linking.

The composite-material shaped product obtained as above contains less-damaged CNTs that are uniformly dispersed in the matrix of the polymer material. This enables the composite-material shaped product to exhibit superior electrical conductivity and mechanical characteristics.

The composite-material shaped product may be used, without particular limitation, for example as a material of a hose, a tire, and an electromagnetic wave shield.

EXAMPLES

Hereinafter, the disclosed products and methods will be specifically described with reference to Examples; however, the disclosure is not limited to the Examples.

The CNTs used in the Examples and the Comparative Examples were synthesized by the following methods. The electrical conductivity of the composite material and the surface resistivity of the coating were evaluated by the following methods.

(Synthesis of Carbon Nanotubes)

Synthesis Example 1: Synthesis of SGCNT-1

In accordance with the disclosure of Japanese Patent No. 4621896, SGCNT-1 was produced by a super growth method.

Specifically, CNTs were grown under the following conditions:

Carbon compound: Ethylene, feed rate of 50 sccm
Atmosphere (gas): Helium and hydrogen mixed gas, feed rate of 1000 sccm
Pressure: 1 atmospheric pressure
Moisture vapor addition amount: 300 ppm
Reaction temperature: 750° C.
Reaction time: 10 min
Metallic catalyst: Iron thin film, thickness of 1 nm
Substrate: Silicon wafer The obtained SGCNT-1 had a BET specific surface area of 1050 m$^2$/g (unopened). In the measurement using a Raman spectrophotometer, spectra of a radial breathing mode (RBM) were observed in a low-wavenumber domain of 100 to 300 cm$^{-1}$, which is characteristic of single-walled CNTs. The diameter of 100 randomly selected SGCNT-1 were also measured with a transmission electron microscope, yielding an average diameter (Av) of 3.3 nm, a diameter distribution (3σ) of 1.9 nm, and their ratio (3σ/Av) of 0.58.

Synthesis Example 2: Synthesis of SGCNT-2

Other than altering the thickness of the iron thin film of Synthesis Example 1, which serves as a metallic catalyst, to 5 nm, the same procedures were followed to obtain SGCNT-2. The obtained SGCNT-2 had a BET specific surface area of 620 m$^2$/g (unopened). In the measurement using a Raman spectrophotometer, spectra of a radial breathing mode (RBM) were observed in a low-wavenumber domain of 100 to 300 cm$^{-1}$, which is characteristic of single-walled CNTs. The diameter of 100 randomly selected SGCNT-2 were also measured with a transmission electron microscope, yielding an average diameter (Av) of 5.9 nm, a diameter distribution (3σ) of 3.3 nm, and their ratio (3σ/Av) of 0.56. Observation by a transmission electron microscope revealed that SGCNT-2 contains double-walled CNTs.

Synthesis Example 3: Synthesis of SGCNT-3

Other than altering the thickness of the iron thin film of Synthesis Example 1, which serves as a metallic catalyst, to 3 nm, the same procedures were followed to obtain SGCNT-3. The obtained SGCNT-3 had a BET specific surface area of 820 m$^2$/g (unopened). In the measurement using a Raman spectrophotometer, spectra of a radial breathing mode (RBM) were observed in a low-wavenumber domain of 100 to 300 cm$^{-1}$, which is characteristic of single-walled CNTs. The diameter of 100 randomly selected SGCNT-3 were also measured with a transmission electron microscope, yielding an average diameter (Av) of 5.8 nm, a diameter distribution (3σ) of 3.3 nm, and their ratio (3σ/Av) of 0.57.

(Evaluation Method)

<Electrical Conductivity>

Using a low-resistivity meter (product name: "Loresta®-GP MCP-T610", manufactured by Mitsubishi Chemical Analytech, Co., Ltd), electrical conductivity was measured in the following manner in accordance with JIS K7194.

First, 450 mg of a prepared composite material, placed under vacuum, was vacuum-pressed at a temperature of 120° C. under a pressure of 0.4 MPa for 5 minutes. The composite material was then shaped into a thin disk with a diameter of about 40 to 60 mm and a thickness of 100 to 500 μm. From the disk, four test pieces of a square shape of 10 mm by 10 mm were cut out as sample pieces of the measurement. A PSP probe was selected for the 4-terminal probe of the low-resistivity meter. The sample pieces were secured to an insulating board. The probe was pressed to the center portion of each sample piece (i.e., the position 5 mm in height and width from the sides of the sample piece) and a voltage of 10 V was applied to measure electrical conductivity. The electrical conductivities of four sample pieces were measured and the average thereof was defined as the electrical conductivity of the composite material.

<Surface Resistivity>

Using a low-resistivity meter (product name: "Loresta®-GP MCP-T610", manufactured by Mitsubishi Chemical Analytech, Co., Ltd), surface resistivity was measured in the following manner in accordance with JIS K7194.

Specifically, the surface resistivity of a prepared coating was measured at a relative humidity of 20% and at a temperature of 25° C. using a four-terminal method.

Example 1

To 500 mL of 1 mass % aqueous solution of sodium dodecylbenzenesulfonate (SDBS), 2.5 g of SGCNT-1 obtained in Synthesis Example 1 was added, and a coarse dispersion liquid containing SDBS as a surfactant was obtained. This SGCNT-1-containing coarse dispersion liquid was charged into a high-pressure homogenizer (product name: "BERYU SYSTEM PRO" manufactured by Beryu Corp.) equipped with a multi-step pressure control device ("multi-step pressure reducer") for applying a back pressure during dispersion, and was subjected to a dispersion process at a pressure of 100 MPa. Specifically, dispersion of SGCNT-1 was performed by subjecting the coarse dispersion liquid to a shear force while also subjecting it to a back pressure. The dispersion process was performed while returning a dispersion liquid flown from the high-pressure homogenizer back again to the high-pressure homogenizer.

After the dispersion process of 10 minutes, a SGCNT-1 dispersion liquid without any visually-observable aggregate was obtained.

Subsequently, 5.8 g of the obtained SGCNT-1 dispersion liquid and 0.5 g of acrylonitrile-butadiene rubber latex (product name: "Nipol® 1561" manufactured by Zeon Corporation) were mixed together and stirred for 2 hours to obtain a composite material composition. Meanwhile, 2-propanol and a stirrer were placed in a beaker to prepare 2-propanol that is in a stirred state. To the beaker, the composite material composition as prepared was gradually added to be solidified into a composite material in the form of crumb contained in the 2-propanol. Thereafter, the composite material was removed from 2-propanol by suction filtration and was vacuum-dried for 24 hours or more in a vacuum drier (at 40° C.) to thereby obtain 0.225 g of composite material 1. The yield of the composite material (=[(mass of the obtained composite material)/{(mass of the charged rubber)+(mass of the charged SGCNT-1)}]×100%) was 98%. The composite material 1 was shaped into a thin disk. This composite-material shaped product was a flexible rubbery material, and the electrical conductivity of the product was 3.1 S/cm.

Example 2

Other than changing the coarse dispersion liquid charged into the high-pressure homogenizer in Example 1 to a liquid formed by adding 1 g of SGCNT-1 to 500 mL of 1 mass % concentration SDBS aqueous solution, the dispersion process of Example 1 was followed to obtain a SGCNT-1 dispersion liquid.

After the dispersion process of 7 minutes, a SGCNT-1 dispersion liquid without any visually-observable aggregate was obtained.

Subsequently, other than mixing 2.3 g of the obtained SGCNT-1 dispersion liquid with 0.5 g of acrylonitrile-butadiene rubber latex (product name: "Nipol® 1561" manufactured by Zeon Corporation), the procedures of Example 1 were followed to obtain a composite material 2. The composite material 2 was shaped into a thin disk. This composite-material shaped product was a flexible rubbery material, and the electrical conductivity of the product was 2.81 S/cm.

Example 3

Other than changing the SGCNT-1 used in Example 1 to the SGCNT-2 obtained in Synthesis Example 2, the procedures of Example 1 were followed to obtain a SGCNT-2 dispersion liquid and a composite material 3. After the dispersion process of 10 minutes, a SGCNT-2 dispersion liquid without any visually-observable aggregate was obtained. The composite material 3 obtained was shaped into a thin disk. This composite-material shaped product was a flexible rubbery material, and the electrical conductivity of the product was 3.92 S/cm.

Example 4

Other than changing the SGCNT-1 used in Example 1 to the SGCNT-3 obtained in Synthesis Example 3, the procedures of Example 1 were followed to obtain a SGCNT-3 dispersion liquid and a composite material 4. After the dispersion process of 10 minutes, a SGCNT-3 dispersion liquid without any visually-observable aggregate was obtained. The composite material 4 obtained was shaped into a thin disk. This composite-material shaped product was a flexible rubbery material, and the electrical conductivity of the product was 4.00 S/cm.

Comparative Example 1

The high-pressure homogenizer (product name: "BERYU SYSTEM PRO" manufactured by Beryu Corp.) was replaced by a high-pressure wet-type jet mill (product name: "B-ED" manufactured by Yoshida Kikai Co., Ltd.) and no back pressure was applied during dispersion. Other than those, the procedures of Example 2 were followed to perform the dispersion process of the coarse dispersion liquid.

After the dispersion process of 10 minutes or less, the aggregates of SGCNT-1 were still visually observed. The dispersion process was thus continued. Sixty minutes after the start of the dispersion process, a Comparative Example SGCNT-1 dispersion liquid without any visually-observable aggregate was obtained.

Subsequently, other than changing the SGCNT-1 dispersion liquid to the Comparative Example SGCNT-1 dispersion liquid, the procedures of Example 2 were followed to obtain a composite material 5. The composite material 5 was shaped into a thin disk. This composite-material shaped product was a flexible rubbery material, and the electrical conductivity of the product was 0.84 S/cm.

The electrical conductivity of the composite-material shaped product of Comparative Example 1 was less than one third of the electrical conductivity of the composite-material shaped product of Example 2. This demonstrates that the SGCNT-1 contained in the composite-material shaped product of Comparative Example 1 was greatly damaged.

Comparative Example 2

Other than changing the addition amount of the SGCNT-1 of Comparative Example 1 to 2.5 g, the procedures of Comparative Example 1 was followed to perform the dispersion process. However, the high-pressure wet-type jet mill was clogged in the middle of the process and the dispersion process was not completed.

Example 5

To 500 mL of 1-methyl-2-pyrrolidone (NMP), 7.5 g of SGCNT-1 obtained in Synthesis Example 1 was added to obtain a coarse dispersion liquid. This SGCNT-1-containing coarse dispersion liquid was charged into a high-pressure homogenizer (product name: "BERYU SYSTEM PRO" manufactured by Beryu Corp.) equipped with a multi-step pressure control device ("multi-step pressure reducer") for applying a back pressure during dispersion, and the coarse dispersion liquid was subjected to a dispersion process at a pressure of 200 MPa. Specifically, dispersion of SGCNT-1 was performed by subjecting the coarse dispersion liquid to a shear force while also subjecting it to a back pressure. The dispersion process was performed while returning a dispersion liquid flown from the high-pressure homogenizer back again to the high-pressure homogenizer.

After the dispersion process of 8 minutes, a high-concentration SGCNT-1 dispersion liquid in the form of smooth paste was obtained.

Subsequently, the high-concentration SGCNT-1 dispersion liquid as obtained was applied onto a glass plate and heat-dried for 4 hours at 80° C. and then for 8 hours at 160° C. As a result, a uniform, black coating was obtained on the glass plate and the surface resistivity thereof was 0.843 Ω/sq.

Example 6

Other than changing the solvent used in Example 5 from 1-methyl-2-pyrrolidone to methyl isobutyl ketone and changing the CNT from SGCNT-1 to SGCNT-2 obtained in Synthesis Example 2, the procedures of Example 5 were followed to obtain a high-concentration SGCNT-2 dispersion liquid.

After the dispersion process of 8 minutes, a high-concentration SGCNT-2 dispersion liquid in the form of smooth paste was obtained.

Subsequently, the high-concentration SGCNT-2 dispersion liquid as obtained was applied onto a glass plate and heat-dried for 4 hours at 80° C. and then for 8 hours at 160° C. As a result, a uniform, black coating was obtained on the glass plate and the surface resistivity thereof was 0.221 Ω/sq.

Example 7

Other than changing the solvent used in Example 5 from 1-methyl-2-pyrrolidone to methyl isobutyl ketone and changing the CNT from SGCNT-1 to SGCNT-3 obtained in Synthesis Example 3, the procedures of Example 5 were followed to obtain a high-concentration SGCNT-3 dispersion liquid.

After the dispersion process of 8 minutes, a high-concentration SGCNT-3 dispersion liquid in the form of smooth paste was obtained.

Subsequently, the high-concentration SGCNT-3 dispersion liquid as obtained was applied onto a glass plate and heat-dried for 4 hours at 80° C. and then for 8 hours at 160° C. As a result, a uniform, black coating was obtained on the glass plate and the surface resistivity thereof was 0.200 Ω/sq.

Comparative Example 3

The high-pressure homogenizer (product name: "BERYU SYSTEM PRO" manufactured by Beryu Corp.) was replaced by a high-pressure wet-type jet mill (product name: "B-ED" manufactured by Yoshida Kikai Co., Ltd.) and no back pressure was applied during dispersion. Other than those, the procedures of Example 5 were followed to perform the dispersion process of the coarse dispersion liquid. However, the high-pressure wet-type jet mill was clogged in the middle of the process and the process was not completed.

Comparative Example 4

Other than replacing the SGCNT-1 used in Example 5 by HiPCO (a single-walled carbon nanotube, manufactured by Unidym, with a BET specific surface area of 540 m$^2$/g (unopened)), the procedures of Example 5 were followed to obtain a Comparative Example high-concentration CNT dispersion liquid. The Comparative Example high-concentration CNT dispersion liquid, which was obtained by performing dispersion process for 8 minutes, included visually-observable aggregates.

Subsequently, the Comparative Example high-concentration CNT dispersion liquid as obtained was applied onto a glass plate and heat-dried for 4 hours at 80° C. and then for 8 hours at 160° C. However, no uniform coating was obtained.

Examples 1 to 4 and Comparative Example 1, and Examples 5 to 7 and Comparative Example 4 demonstrate that the method for producing a carbon nanotube dispersion liquid disclosed herein provides a CNT dispersion liquid in which less-damaged CNTs are highly dispersed. In particular, Examples 1 to 4 and Comparative Example 1 demonstrate that the use of the CNT dispersion liquid produced in accordance with the disclosed method allows a prepared composite material and composite-material shaped product to exhibit good electrical conductivity. Examples 5 to 7 and Comparative Example 4 demonstrate that the use of the CNT dispersion liquid produced in accordance with the disclosed method allows for production of a uniform coating having superior electrical conductivity.

Examples 1 and 5, and Comparative Examples 2 and 3 demonstrate that while the use of a common high-pressure wet-type jet mill, which performs dispersion by using shocks generated when the liquid ejected from an orifice is collided, would be clogged with the CNTs at a narrow tube, the use of a high-pressure homogenizer allows for preparation of a CNT dispersion liquid with high-concentration, since the high-pressure homogenizer performs the dispersion process by using a shear force caused when the liquid passes through an orifice with sufficiently large inner diameter for the CNTs and includes a multi-step pressure reducer whose orifice inner diameter is gradually reduced.

INDUSTRIAL APPLICABILITY

One or more embodiments herein provide a method for efficiently producing a carbon nanotube dispersion liquid in which less-damaged CNTs are highly dispersed.

Another embodiment provides a method for producing a composite material composition and a method for producing a composite material including the carbon nanotube dispersion liquid produced by the above method for producing a carbon nanotube dispersion liquid.

Still another embodiment provides a composite material and a composite-material shaped product with superior electrical conductivity and mechanical characteristics.

REFERENCE SIGNS LIST

1 Reservoir
2 High pressure pump
3 Disperser
4 Heat exchanger
5 Multi-step pressure reducer
6 Return line
7 Flow path switch valve (three-way valve)
10 Dispersion system

The invention claimed is:

1. A method for producing a carbon nanotube dispersion liquid, comprising:
- (A) obtaining a carbon nanotube dispersion liquid by applying a shear force to a coarse dispersion liquid that includes carbon nanotubes having a specific surface area of 600 $m^2/g$ or more to whereby disperse the carbon nanotubes,
- wherein the step (A) includes applying a back pressure to the carbon nanotube dispersion liquid, and
- (B) reducing multi-stepwise the back pressure applied to the carbon nanotube dispersion liquid obtained by the step (A),
- wherein the step (B) includes passing the carbon nanotube dispersion liquid through a plurality of pressure reducers connected in series.

2. The method for producing a carbon nanotube dispersion liquid according to claim 1,
wherein the step (A) further includes cooling the carbon nanotube dispersion liquid.

3. A method for producing a composite material composition comprising: (X) mixing together the carbon nanotube dispersion liquid obtained by the method for producing a carbon nanotube dispersion liquid according to claim 1 and a polymer material-containing liquid.

4. A method for producing a composite material comprising: (Y) solidifying the composite material composition obtained by the method for producing a composite material composition according to claim 3.

5. A method for producing a carbon nanotube dispersion liquid, comprising:
- (A) obtaining a carbon nanotube dispersion liquid by applying a shear force to a coarse dispersion liquid that includes carbon nanotubes having a specific surface area of 600 $m^2/g$ or more to whereby disperse the carbon nanotubes,
- wherein the step (A) includes applying a back pressure to the carbon nanotube dispersion liquid and cooling the carbon nanotube dispersion liquid by a heat exchanger or a coolant supplying mechanism and
- (B) reducing multi-stepwise the back pressure applied to the carbon nanotube dispersion liquid obtained by the step (A),
- wherein the step (B) includes passing the carbon nanotube dispersion liquid through a plurality of pressure reducers connected in series.

* * * * *